United States Patent [19]

Schaal

[11] Patent Number: 5,625,546

[45] Date of Patent: Apr. 29, 1997

[54] METHOD AND APPARATUS FOR THE VARIABLE ALLOCATION OF STATIC INVERTERS TO AT LEAST ONE LOAD

[75] Inventor: Christian Schaal, Dietlikon, Switzerland

[73] Assignee: Inventio AG, Hergiswil NW, Switzerland

[21] Appl. No.: 527,451

[22] Filed: Sep. 13, 1995

[30] Foreign Application Priority Data

Sep. 21, 1994 [CH] Switzerland .................. 02880/94

[51] Int. Cl.$^6$ ................................................ H02M 7/00
[52] U.S. Cl. ................... 363/71; 307/58; 307/82
[58] Field of Search .......................... 363/71, 80, 97, 363/131; 307/58, 82

[56] References Cited

U.S. PATENT DOCUMENTS

| 3,675,037 | 7/1972 | Hamilton | 307/51 |
| 3,846,693 | 11/1974 | Compoly et al. | 321/12 |
| 4,150,425 | 4/1979 | Frosch | 363/56 |
| 4,956,762 | 9/1990 | Loveness et al. | 363/65 |

FOREIGN PATENT DOCUMENTS

| 0600312 | 6/1994 | European Pat. Off. |
| 198878 | 11/1984 | Japan. |
| 682531 | 9/1993 | Switzerland. |
| 9209137 | 5/1992 | WIPO. |

*Primary Examiner*—Peter S. Wong
*Assistant Examiner*—Adolf Berhane
*Attorney, Agent, or Firm*—Howard & Howard Attorneys

[57] ABSTRACT

An apparatus and a method for allocating static inverters to loads involves regulating an inverter to be switched to zero current flow at the instant of switching. Each inverter is connected to an input distributor for receiving inverter drive signals and to an output distributor for supplying power to a load. An equalizing regulator controls the share of total current generated by each inverter connected to the load limited by the capacity of the inverter. A total current regulator controls the total current supplied to the load limited by the total of the capacities of the inverters connected to the load.

15 Claims, 6 Drawing Sheets

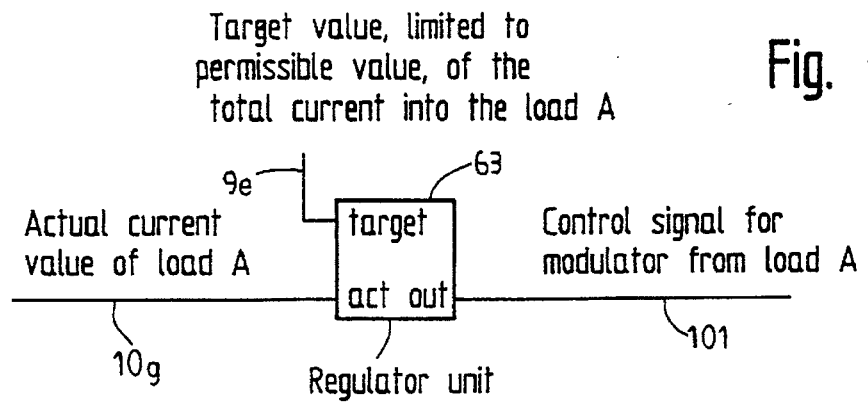
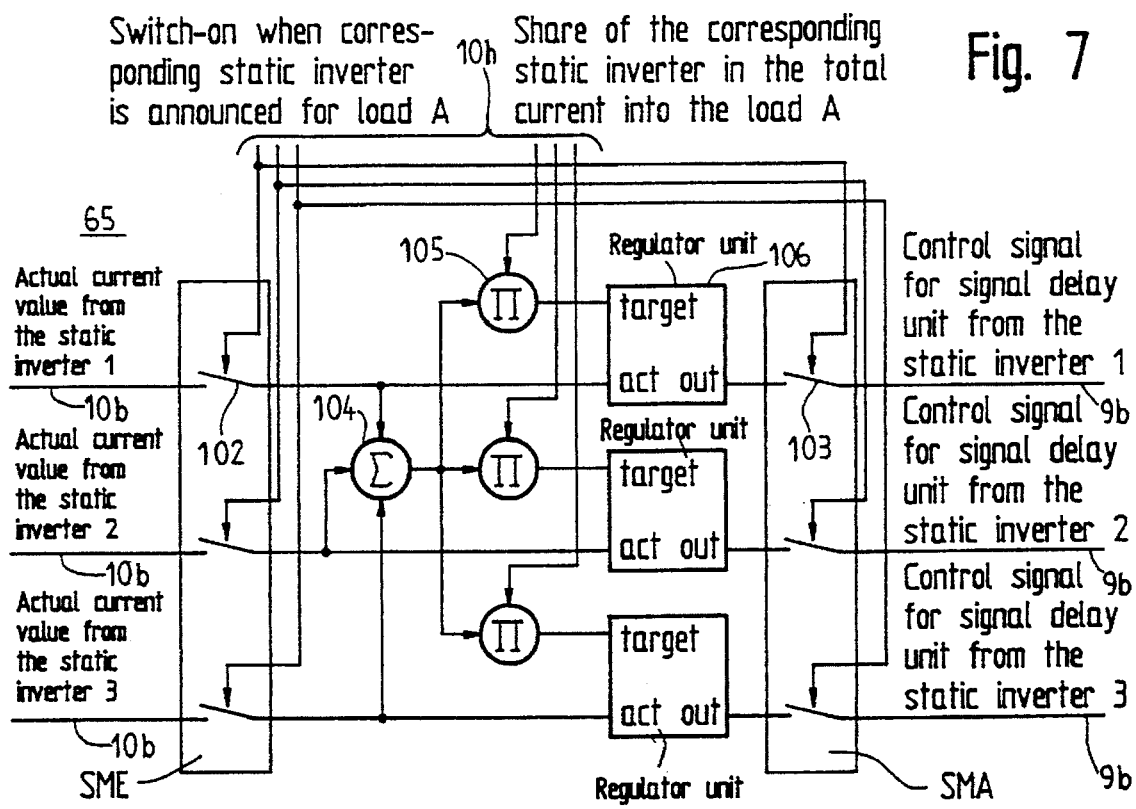
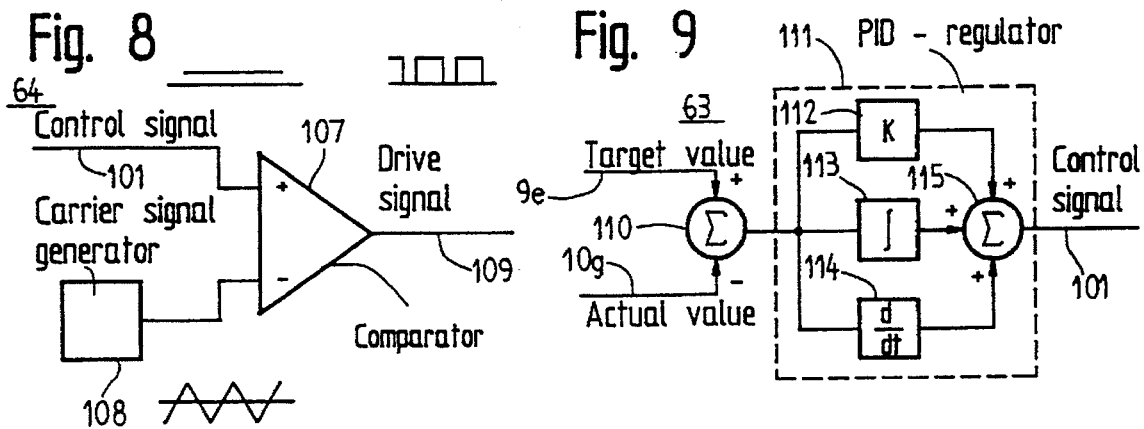

METHOD AND APPARATUS FOR THE VARIABLE ALLOCATION OF STATIC INVERTERS TO AT LEAST ONE LOAD

BACKGROUND OF THE INVENTION

The present invention relates generally to a method and apparatus for allocating static inverters to a load and, in particular, to a method and apparatus for controlling the share of the load for each static inverter.

There is shown in the Swiss patent specification 682 531 a method by which static inverters are connected in parallel to feed electrical power to a load. A main regulator determines when the upper and lower switches of all partial static inverters must be switched on or off together from a comparison of the total output current of the parallel connected static inverters with the current target value. This switching instant is preset for the individual static inverters as a target value. Each static inverter has the ability to vary the exact instant for its switching in a small range, a time window, and thus to bring about a current equalization. Defective units can be disconnected during operation. Additional static inverters can be switched in or out during operation in order to adapt to different load states.

In the aforedescribed method, the static inverters are connected in parallel in order to feed a load. There is the possibility that the time window allows switches to close before the time zero point or open after the time zero point. Thereby, a hot path is formed between the corresponding switches of the partial static inverters. A static inverter switched away from the load cannot be used for the feeding of a further load.

SUMMARY OF THE INVENTION

The present invention concerns an apparatus for allocating at least one static inverter to at least one load. The apparatus includes an allocated static inverter adapted to be connected to a source of direct current power for generating alternating current power in response to an inverter drive signal; a control unit for allocating the allocated static inverter to a load, for generating a target current value signal representing a total current to be supplied to the load and for generating a current share signal for each static inverter connected to the load, each current share signal representing a share of the total current to be supplied by an associated static inverter connected to the load; an output distributor connected to the control unit and to the allocated static inverter and being responsive to a first control signal generated by the control unit for applying alternating current power from the allocated static inverter to the load. The apparatus further includes an equalizing regulator means connected to the control unit and to the allocated static inverter and being responsive to a second control signal and to the current share signal generated by the control unit and to an actual inverter current value signal representing actual current flowing from the allocated static inverter to the load for regulating the actual current to the share for the allocated static inverter; a current measuring member connected in series with the output distributor and the load and responsive to current flowing to the load for generating an actual total current value signal; a total current regulator means connected to the control unit and to the current measuring member and being responsive to the target current value signal and the actual total current value signal for controlling a modulator means; a modulator means connected to the total current regulator and to the input distributor and being responsive to control by the total current regulator for driving the allocated static inverter to generate alternating current power; and an input distributor connected to the control unit, the modulator means and the allocated static inverter and being responsive to a third control signal generated by the control unit for connecting the modulator means to the allocated static inverter.

The apparatus and method according to the present invention solves a problem of the known equipment by connecting to or disconnecting from a load at least one static inverter free of current flow.

The advantages of the present invention are that a superordinate control or regulator enables a variable allocation of any desired static inverter or static inverter group to one or more loads. This means that a static inverter can be switched from one load to another load during operation. Furthermore, a defective static inverter or one to be maintained can be separated from the load and be replaced by another static inverter without interruption of operation. Thereby, an increased operational reliability, an unrestricted availability and a simple maintenance of the entire static inverter system is assured.

It is also advantageous that the static inverter capacity required can be reduced by comparison with a conventional system in the case that the individual loads do not demand their full power at the same time. It is furthermore advantageous that the switch loading is reduced, since no current flows at the moment of switching and that the equalizing regulation is not disturbed by the switching operation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 6 is a schematic block diagram of one phase of a three-phase total current regulator of the static inverter system shown in the FIG. 2;

FIG. 7 is a schematic block diagram of one phase of a three-phase equalizing regulator of the static inverter system shown in the FIG. 2;

FIG. 8 is a schematic block diagram of one phase of a three-phase modulator of the static inverter system shown in the FIG. 2;

FIG. 9 is a schematic block diagram of a regulator unit used in the regulators shown in the FIGS. 6 and 7;

DESCRIPTION OF THE PREFERRED EMBODIMENT

Figure 1:
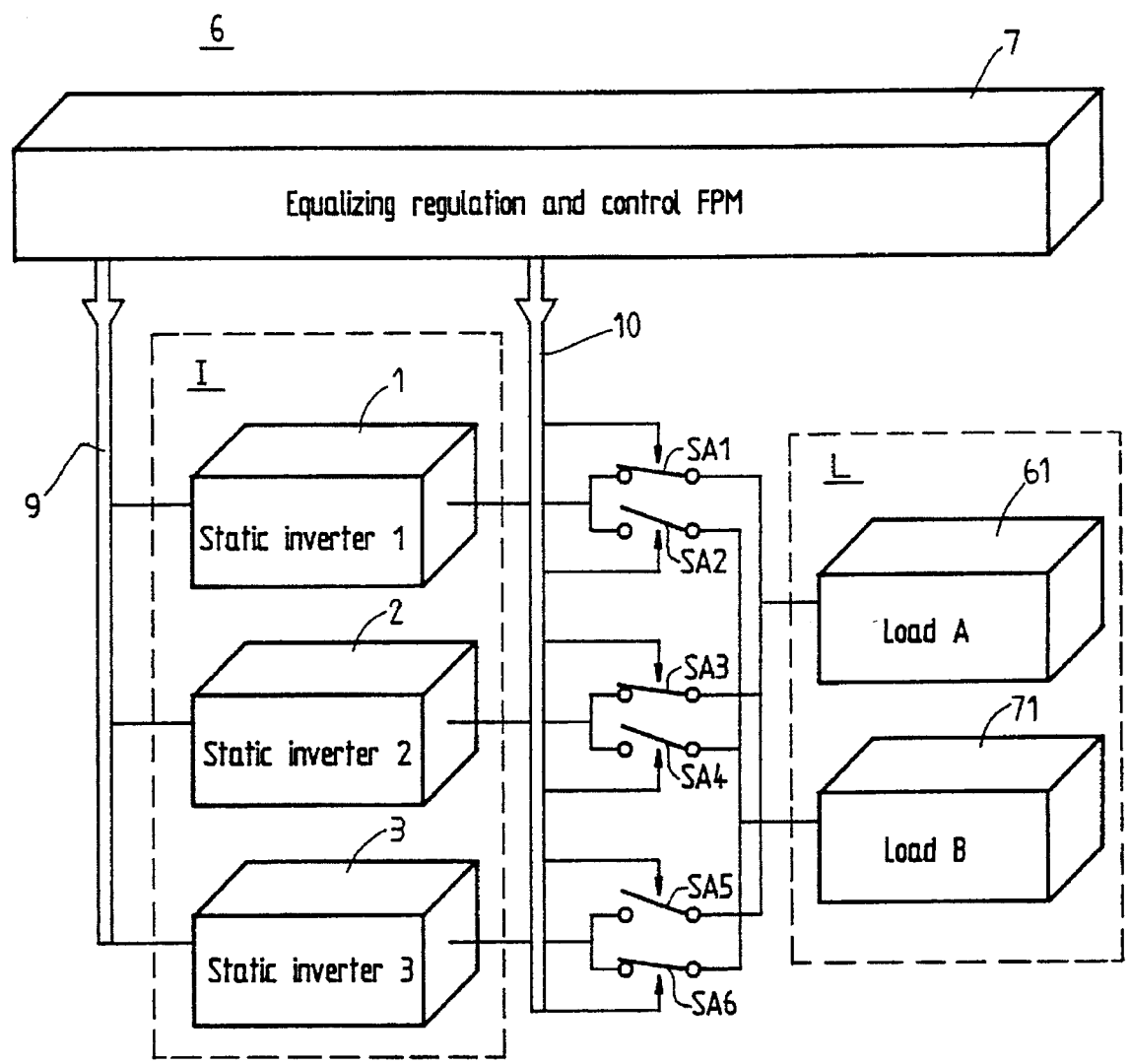
FIG. 1 is a schematic block diagram of a static inverter system with three static inverters and two loads in accordance with the present invention.

There is shown in the FIG. 1 a static inverter system for supplying alternating current electrical power to a load from a source of direct current electrical power according to the present invention. A variable allocation of at least one static inverter or at least one static inverter group I to at least one load or at least one load group L can be performed. For the purposes of illustration, the inverter group I includes three static inverters 1, 2 and 3 each having an output connected to an input of a pair of switching means of a system control 6. A first pair of switching means SA1 and SA2 is connected the inverter 1, a second pair of switching means SA3 and SA4 is connected to the inverter 2, and a third pair of switching means SA5 and SA6 is connected to the inverter 3. The switching means SA1 through SA6 each have an output connected to the load group L. The switching means SA1, SA3 and SA5 each have an output connected to a first load, Load A 61, of the load group L and the switching means SA2, SA4 and SA6 each have an output connected to a second load, Load B 71, of the load group. The system control 6 also includes an equalizing regulation and control unit 7 denoted as Flexible Power Management or FPM. The unit 7 is connected to inputs of the static inverters 1, 2 and 3 by a first signal bus 9 and is connected to outputs of the inverters 1, 2 and 3 and to inputs of the switching means SA1 through SA6 by a second signal bus 10.

Such a static inverter system has numerous advantages by comparison with a conventional system in which each load is fixedly connected with its individual static inverter. In the present system, the static inverter 1 is connected to the Load A 61 through the closed switch SA1, the static inverter 2 is connected to the Load A 61 through the closed switch SA3 and the static inverter 3 is connected to the Load B 71 through the closed switch SA6. In case the static inverter 3 fails, it is separated from the Load B 71 by opening the switch SA6. Subsequently, the current supply to the Load B 71 can be resumed by opening the switch SA3 to disconnect the static inverter 2 from the Load A 61 and by closing the switch SA4 to connect the static inverter 2 to the Load B 71. The Load A 61 is then supplied with electrical power only from the static inverter 1.

In a large system with many static inverters, an additional reserve static inverter, which is not used in normal operation, is of no great consequence. Such a system has the advantage that the normal operation can be maintained even in the case of the failure of one static inverter. The maintenance is simplified and improved since one static inverter can be separated from the system and can be replaced by another static inverter. When a static inverter has to be serviced, it is not necessary, as is the case in a conventional system, to stop operations because one static inverter is not operational. In a large system with reserve static inverters, it is possible to fully maintain the normal operation utilizing the present invention. Assuming that the Load A 61 and the Load B 71 each require the capacity of one static inverter during normal operation and only rarely, for example for acceleration, require the capacity of two static inverters, the three static inverters shown in the FIG. 1 suffice when it is guaranteed by a control or by the system that the loads do not need their peak power at the same time. In a conventional system, four static inverters would be required to keep the system running. The effect of the reduction in the static inverter power required to be installed is greater as the system size increases and the greater are the differences between the power requirement in normal operation and the maximum power requirement.

Figure 2:
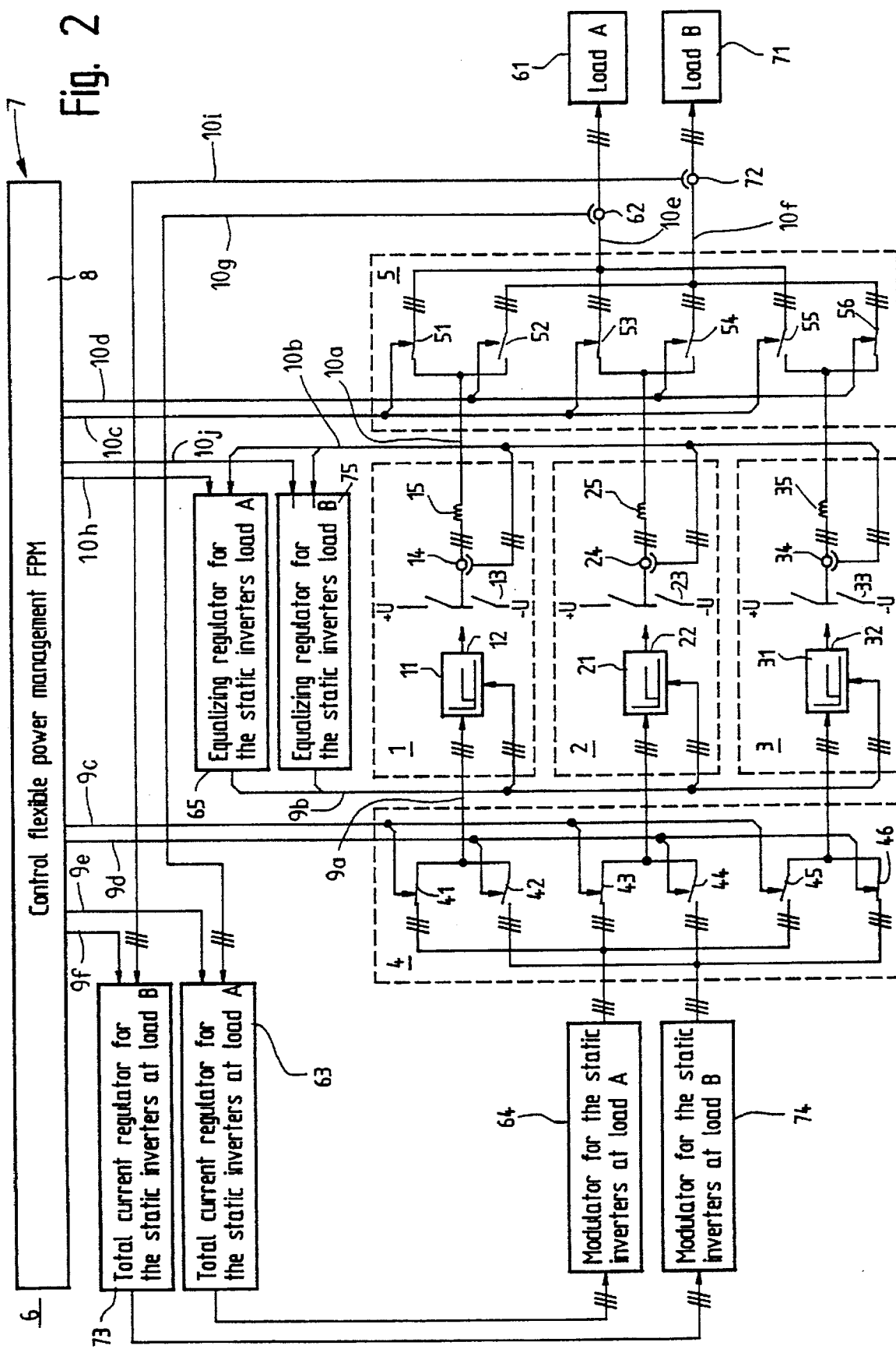
FIG. 2 is a more detailed schematic block diagram of the apparatus shown in the FIG. 1.

The FIG. 2 is a more detailed schematic block diagram of the system shown in the FIG. 1. The static inverter 1 includes a three-phase signal delay and drive unit having a signal delay circuit 11 (shown in the FIG. 3) and a drive circuit 12 (shown in the FIG. 4), a 6-pulse bridge 13 (shown in the FIG. 5), a current measuring member 14, and a connecting choke 15. The three-phase signal delay unit 11 operates as a setting member for the equalizing regulation. The three-phase drive unit 12 provides a dead time and the conductive separation between the logic and power circuits. The current measuring member 14 detects the current flows of the three phases of electrical current and thus the actual values for the equalizing regulation. A first or inverter drive signal input of the inverter 1 is connected to an inverter drive signal line 9a of the bus 9 and to a drive signal input of the signal delay circuit 11. A second or inverter control signal input of the inverter 1 is connected to an inverter control signal line 9b of the bus 9 and to a control signal input of the signal delay circuit 11. As explained in connection with the FIGS. 3–5, the signal delay circuit 11 has a drive signal output connected to a drive signal input of the drive circuit 12. The drive circuit 12 has switch control outputs for controlling switches of the bridge 13 which switches are connected to a positive potential +U and a negative potential −U of a direct current power source. An output of the bridge 13 is connected to an input of the current measuring member 14. A first output of the member 14 is connected through the choke 15 to a first or power output of the first inverter 1 which is connected to a power output line 10a of the second bus 10. A second or sensing output of the member 14 is connected to a second or actual inverter current value output of the inverter 1 which is connected to an actual inverter current value signal line 10b of the bus 10.

The static inverter 2 is similar to the static inverter 1 and includes a three-phase signal delay circuit 21, a three-phase drive circuit 22, a 6-pulse bridge 23, a current-measuring member 24, and a connecting choke 25. The static inverter 3 is similar to the static inverters 1 and 2 and includes a three-phase signal delay circuit 31, a three-phase drive circuit 32, a 6-pulse bridge 33, a current-measuring member 34, and a connecting choke 35. Since the three static inverters are similar, only the static inverter 1 has been discussed in detail.

The equalizing regulation and control unit 7 includes an input distributor 4 representing a drive side and an output distributor 5 representing a power side, both distributors being constructed as a crossbar distributor, and a control unit 8 connected to the distributors and to the static inverters 1, 2 and 3. The input distributor 4 includes a plurality of electromechanical or electronic three pole switching means 41 through 46 associated in pairs with corresponding ones of the inverters 1, 2 and 3. The control unit 8 has a pair of input distributor switch control signal outputs connected to a pair of switch control signal lines 9c and 9d of the first signal bus 9, each of the switch control signal lines being connected to separate switch control signal input of the input distributor 4. The line 9c is connected to a first switch control signal input of the distributor 4 which in turn is connected to a switch control signal input of each of the switching means 41, 43 and 45. The line 9d is connected to a second switch control signal input of the distributor 4 which in turn is connected to a switch control signal input of each of the switching means 42, 44 and 46. The inverter drive signal line 9a is connected to a first inverter drive signal output of the input distributor 4 which output is connected to an output side of each of the switching means 41 and 42. In a similar manner, the output sides of the switching means 43 and 44 are connected to a second inverter drive signal output of the input distributor 4 which is connected to a drive signal input of the inverter 2 and the output sides of the switching means 45 and 46 are connected to a third inverter drive signal output of the input distributor which output is connected to a drive signal input of the inverter 3. The number of switch control signal lines, 9a and 9b, and the number of switching means connected to each inverter drive signal output is equal to the number of different loads to which the static inverter can be connected.

The control unit 8 also has a pair of output distributor outputs connected to a pair of switch control signal lines 10c and 10d of the second signal bus 10, each of the signal lines being connected to a separate switch control signal input of the output distributor 5. The output distributor 5 includes a plurality of electromechanical or electronic three pole switching means 51 through 56. The switching means 51 through 56 correspond to the switching means SA1 through SA6 respectively shown in the FIG. 1. The line 10c is connected to a first switch control signal input of the distributor 5, which input is connected to a switch control signal input of each of the switching means 51, 53 and 55, and the line 10d is connected to a second switch control signal input, which is connected to a switch control signal input of each of the switching means 52, 54 and 56. The power output line 10a is connected to a first power input of the output distributor 5 which input is connected to an input side of each of the switching means 51 and 52. In a similar manner, the input sides of the switching means 53 and 54 are connected to a second power input of the distributor 5 which is connected to a power output of the inverter 2 and the input sides of the switching means 55 and 56 are connected to a third power input of the distributor 5 which is connected to a power output of the inverter 3. Output sides of the switching means 51, 53 and 55 are connected to a first power output of the distributor 5 which is connected to the Load A 61 by a first power line 10e of the bus 10. Output sides of the switching means 52, 54 and 56 are connected to a second power output of the distributor 5 which is connected to the Load B 71 by a second power line 10f of the bus 10. As with the input distributor 4, the number of switch control signal lines, 10a and 10b, and the number of switching means connected to each inverter power output is equal to the number of different loads to which the static inverter can be connected.

When the three-pole switches 41 and 51 are closed and the three-pole switches 42 and 52 are open, the static inverter 1 is connected to the Load A 61 by the line 10e. When the three-pole switches 41 and 51 are open and the three-pole switches 42 and 52 are closed, the static inverter 1 is connected to the Load B 71 by the line 10f. When the switches 51 and 52 are open, the static inverter 1 is not connected to any load. When the three-pole switches 43 and 53 are closed and the three-pole switches 44 and 54 are open, the static inverter 2 is connected to the Load A 61. When the three-pole switches 43 and 53 are open and the three-pole switches 44 and 54 are closed, the static inverter 2 is connected to the Load B 71. When the switches 53 and 54 are open, the static inverter 2 is not connected to any load. When the three-pole switches 45 and 55 are closed and the three-pole switches 46 and 56 are open, the static inverter 3 is connected to the Load A 61. When the three-pole switches 45 and 55 are open and the three-pole switches 46 and 56 are closed, the static inverter 3 is connected to the Load B 71. When the switches 55 and 56 are open, the static inverter 3 is not connected to any load.

A current-measuring member 62 is connected in series in the line 10e and measures the total currents flowing into the Load A 61 in all three phases and thus the actual values for the total current regulation of the static inverters connected to the Load A. An actual total current value signal output of the member 62 is connected by an actual total current value signal line 10g of the bus 10 to a first or actual total current value signal input of a total current regulator 63. A second or target current value signal input of the regulator 63 is connected to a target current value signal output of the control 7 by a target current value signal line 9e of the bus 9. The regulator 63 is responsible for the regulation of the total currents in all three phases of the static inverters connected to the Load A 61. A modulator control signal output of the regulator 63 is connected to a modulator control signal input of a modulator 64 which has an inverter drive signal output connected to a first or inverter drive signal input of the distributor 4 which input is connected to the input sides of the switching means 41, 43 and 45. The modulator 64 generates the drive signals of the three phases for the static inverters connected to the Load A 61 on the basis of the conditions set by the total current regulator 63 and is thus the setting member for the total current regulation of the static inverters connected to the Load A. A compensating or equalizing regulator 65 has an actual inverter current value signal input for each inverter connected to the signal line 10b, a pair of inputs for each inverter connected to outputs of the control 7 by a signal line 10h of the bus 10 and an inverter control signal output connected to the line 9b. The regulator 65 is responsible for the regulation of the current distribution in all three phases among the static inverters connected to the Load A 61.

The control FPM 7 supplies the equalizing regulator 65 on the line 10h with a first switch control signal for each of the static inverters 1, 2 and 3 connected to the Load A 61 and, a second current share signal representing the share of the total currents in all three phases to be supplied by the connected inverter. With the aid of these signals, the equalizing regulator 65 computes the target values for the static inverters connected to the Load A 61 from the actual values of the current provided by the signals from the current-measuring members 14, 24 and 34 on the line 10b. These current target values are compared with the current actual values and the inverter control signal is generated therefrom on the line 9b.

A current-measuring member 72 is connected in series in the line 10f and measures the total currents flowing into the Load B 71 in all three phases and thus the actual values for the total current regulation of the static inverters connected to the Load B. An actual total current value signal output of the member 72 is connected by an actual total current value signal line 10i of the bus 10 to an actual total current value signal input of a current regulator 73. A target current value signal input of the regulator 73 is connected to a target current value signal output of the control 7 by a target current value signal line 9f of the bus 9. The regulator 73 is responsible for the regulation of the total currents in all three phases of the static inverters connected to the Load B 71. A modulator control signal output of the regulator 73 is connected to a modulator control signal input of a modulator 74 which has an inverter drive signal output connected to a second inverter drive signal input of the distributor 4 which input is connected to the input sides of the switching means 42, 44 and 46. The modulator 74 generates the drive signals of the three phases for the static inverters connected to the Load B 71 on the basis of the conditions set by the total current regulator 73 and is thus the setting member for the total current regulation of the static inverters connected to the Load B. A compensating or equalizing regulator 75 has an actual inverter current value signal input for each inverter connected to the signal line 10b, a pair of inputs for each inverter connected to outputs of the control 7 by a signal line 10j of the bus 10 and an inverter control signal output connected to the line 9b. The regulator 75 is responsible for the regulation of the current distribution in all three phases among the static inverters connected to the Load B 71.

The control FPM 7 supplies the equalizing regulator 75 on the line 10j with a switch control signal for each of the static inverters 1, 2 and 3 connected to the Load B 71 and current share signal representing the share of the total currents in all three phases to be supplied by the inverter. With the aid of these signals, the equalizing regulator 75 computes the target current values for the static inverters connected to the Load B 71 from the actual values of the current provided by the signals from the current-measuring members 14, 24 and 34 on the line 10b. These target current values are compared with the actual current values and the inverter control signal is produced therefrom on the line 9b. The control Flexible Power Management FPM 8 is responsible for presetting of the target current value and for the control of the static inverter system. The target current values on the lines 9e and 9f are limited by the total of the maximum current capabilities of the inverters connected to the respective loads. The current share values on the lines 10h and 10j are limited by the maximum current capability of the respective inverters.

The method according to the present invention for a variable allocation of static inverters or static inverter groups to one or more loads during operation shall now be explained with the aid of a concrete example with reference to the FIG. 2. The allocation of the static inverters or static inverter groups can take place either on the basis of the measured current requirement of the loads, on the basis of the current requirement to be expected by the selectable driving of the loads or on the basis of the instantaneous availability of the static inverters or static inverter groups. As an initial position, the switches in the input crossbar distributor 4 and in the output crossbar distributor 5 are set as shown in the FIG. 2. Thus, the static inverters 1 and 2 are both connected to the Load A 61. The desired current distribution between the static inverters 1 and 2 in all three phases is managed by the equalizing regulator 65. In the case of static inverters of equal performance capacity, the static inverters 1 and 2 will as a rule each take over 50% of the current flowing into the Load A 61. In this example, the static inverter 3 is connected to the Load B 71.

The switching operation whereby a static inverter is disconnected from one load and connected to another load is explained utilizing the static inverter 2 and switched away from the Load A 61 and to the Load B 71. Initially, the control FPM 7 determines the new maximum current which will result from only one static converter instead of two static converters being connected to the Load A 61 after the static inverter 2 is disconnected. The target current value of the total current regulator 63 must be less than or equal to this maximum current. Only when the total currents in all three phases of the Load A 61 are below the new maximum current, which is achieved by an adequate waiting time or by a variable waiting time that expires as soon as a current below this maximum current is verified by a measurement in all three phases, or by a combination of both these methods, are the currents in all three phases from the static inverter 2 regulated to zero by the equalizing regulator 65. The static inverter 2 thus takes over 0% of the current flowing into the Load A 61 and the static inverter 1 takes over 100%, which is achieved by suitable presettings for the equalizing regulator 65. This is the prerequisite for the static inverter 2 supplying no current during the load switching operation.

Only when the currents in all three phases from the static inverter 2 have become zero, is the command given for the opening of the three-pole switching means 53. After expiration of the decay time of the switching means 53, the static inverter 2 is disconnected from the Load A 61 and therefore no longer is included in the static inverters allocated to the Load A. The static inverter 2 therefore no longer needs to be taken into consideration by the equalizing regulator 65, which is responsible for the regulation of the current distribution in all three phases among the static inverters allocated to the Load A 61. The disconnecting operation now is concluded and the connecting operation begins.

Initially, the three-pole switching means 43 must be opened and the three-pole switching means 44 must be closed. Subsequently, the currents in all three phases from the static inverter 2 are regulated by the equalizing regulator 75 to zero. The static inverter 2 thus takes over 0% of the current flowing into the Load B 71 and the static inverter 3 remains at 100%, which is achieved by suitable presettings for the equalizing regulator 75. This is the prerequisite for the static inverter 2 supplying no current during the connecting operation. Then, the signal for the closing of the switching means 54 is given. After the expiration of the switching time of the switching means 54, the static inverter 2 is connected to the Load B 71 and therefore is included in the static inverters allocated to the Load B. The desired current distribution between the static inverters 2 and 3 in all three phases can therefore now be managed by the equalizing regulator 75. In the case of static inverters of equal power capacity, the static inverters 2 and 3 will as a rule each take over 50% of the current flowing into the Load B 71. When the desired current distribution has been achieved, a new maximum current, which results from two static inverters instead of only one now being allocated to the Load B 71, is set for the current target value of the total current regulator 73.

When only one static inverter is connected to the load, the above-described switching operation of the static inverter can be simplified. Initially, the currents in all three phases are regulated to zero by the total current regulator allocated to the load. This is the prerequisite that the static inverter supplies no current during the disconnecting operation. Only when the currents in all three phases of the load have become zero, is the signal given by the control 7 for the opening of the switching means between the load and the static inverter. After the expiration of the decay time of the switching means, the static inverter is disconnected from the load.

When the first static inverter switched to a load and the only static inverter connected to the load is concerned, the aforedescribed switching operation can be simplified. Initially, the currents in all three phases of this static converter are set to zero by the total current regulator of the load which is to be connected to the static inverter. This is the prerequisite for the static inverter supplying no current during the connecting operation. Then, the signal for the closing of the switching means between the load and the static inverter is generated. After the expiration of the closing time of the switch, the static inverter is connected to the load. The new maximum value, which results from a static inverter now being connected to the load, can therefore be communicated to the total current regulator.

The switching of inverters at zero current has two decisive advantages. First, since no current flows at the instant of switching, the switch contact abrasion is reduced drastically in the case of mechanical switches. The overall size of the mechanical switches is reduced, since the currents need only be conducted and not switched. In the case of electronic switches, the wiring network becomes smaller for the same reason. Second, due to the equalizing regulation of the current of the static inverter to be switched in or away to zero directly before, during and directly after the switching operation, it is itself not disturbed by the switching operation, i.e. there is no disturbing deviation between the target value and the actual value for the current being supplied by the static inverter which is to be switched, either after a static inverter is disconnected or before a static inverter is connected.

Figure 3:
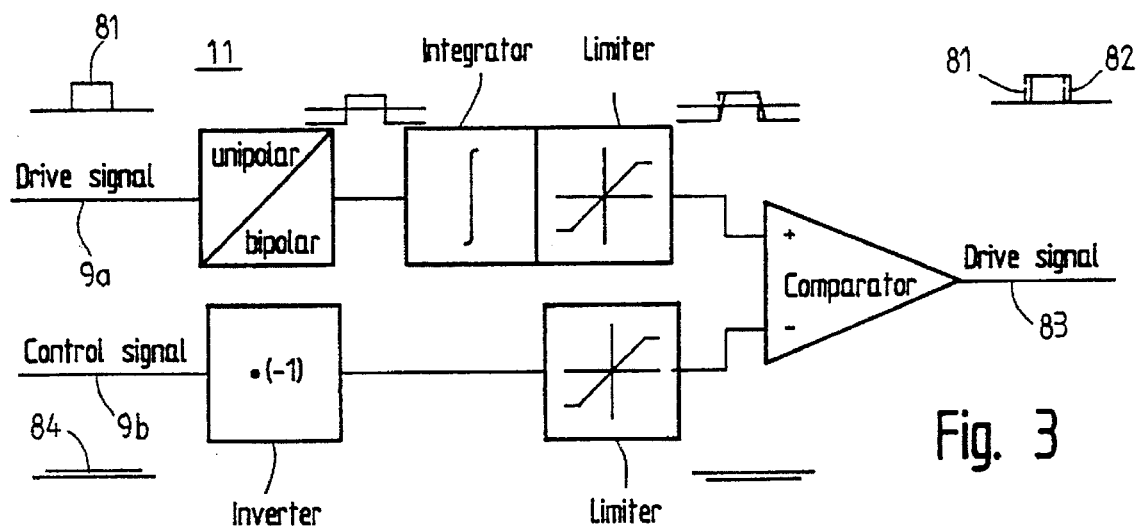
FIG. 3 is a schematic diagram of one phase of a three-phase signal delay unit of the static inverter system shown in the FIG. 2.

There is shown in the FIG. 3 a circuit for one phase of the three-phase signal delay circuit 11 (also the circuits 21 and 31) in the static inverter 1 shown in the FIG. 2. The leading and trailing edges of an inverter drive signal 81 generated by the input distributor 4 on the line 9a for the static inverter are displaced in time by means of a signal delay to generate an output drive signal 82 on an output line 83. The drive signals are logic signals. Logic "0" means that a lower semiconductor switch of the 6-pulse bridge 13 is switched on and logic "1" that an upper semiconductor switch of the bridge is switched on as discussed below. The difference between the inverter drive signals from the modulators 64 and 74 on the line 9a and the output drive signal on the line 83 is that the leading and trailing edges of the output drive signal 82 are delayed slightly relative to the same edges of the inverter drive signal 81. The magnitude of the delay is determined by an inverter control signal 84 of the equalizing regulators 65 and 75 on the line 9b. The inverter control signal 84 is an analog signal. When the inverter control signal 84 is positive, the leading edge of the inverter drive signal 81 is delayed less and the trailing edge more than for a zero magnitude control signal. The time during which the output drive signal 82 is logic "1", is thus enlarged somewhat. In the case of a negative magnitude inverter control signal, the relationships are exactly the reverse.

Figure 4:
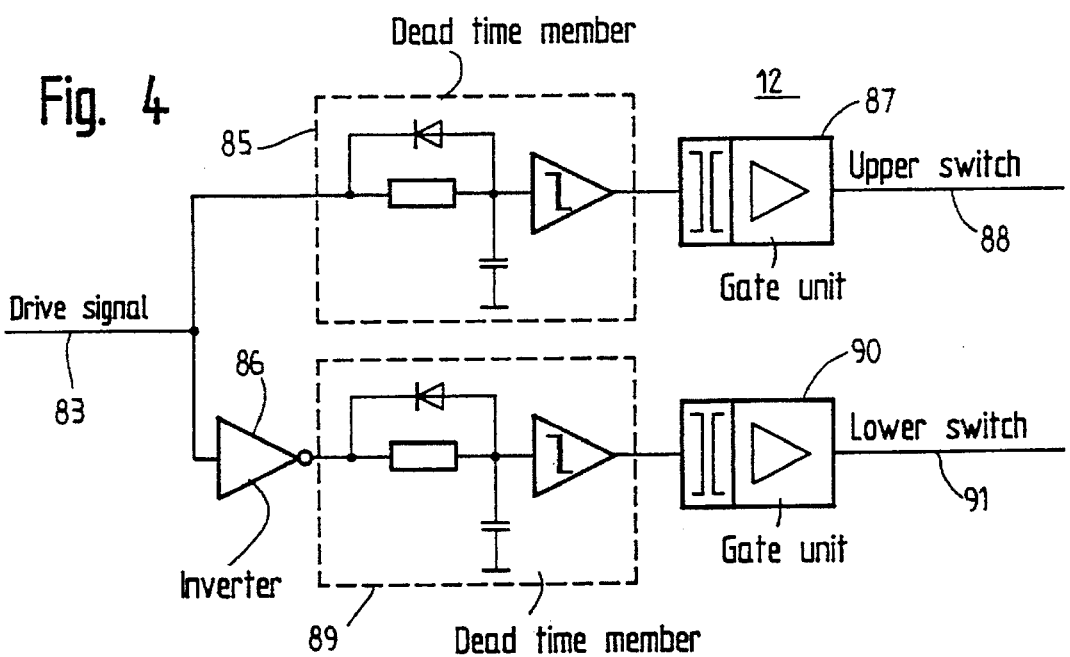
FIG. 4 is a schematic diagram of one phase of a three-phase drive unit of the static inverter system shown in the FIG. 2.

There is shown in the FIG. 4 one phase of the three-phase drive circuit 12 (also the circuits 22 and 32) in the static inverter 1 shown in the FIG. 2. The drive circuit 12 includes circuits for dead time generation and gate units. The output line 83 from the delay circuit 11 is connected to an input of a first dead time member circuit 85 and an input of a signal inverter 86. The member 85 has an output connected to an input of a first gate unit 87 which has an output connected to an upper switch output line 88. The inverter 86 has an output connected to an input of a second dead time member circuit 89. The member 89 has an output connected to an input of a second gate unit 90 which has an output connected to a lower switch output line 91. The drive signal 82 on the line 83 is a logic signal. As stated above, logic "0" means that a lower semiconductor switch of the 6-pulse bridge 13 is switched in and logic "1" that an upper semiconductor switch of the bridge is switched in. The dead time generation produces two output signals, one on the line 88 for the upper switch and one on the line 91 for the lower switch. The output signals also are logic signals. Logic "0" means that the corresponding semiconductor switch is switched off and logic "1" means that the corresponding semiconductor switch is switched on. The task of the dead time generation circuits is to make sure that only one of the semiconductor switches is switched on and that a certain time elapses between switching off one switch and switching on the other switch, during which time both switches are switched off. In terms of circuit technique, the dead time generation consists of a respective dead time member, which influences the leading and trailing switching edges of the drive signals differently in time, wherein the drive signal for the lower switch is generated with the appropriate sign by means of the inverter 86.

The input signal of the gate units 87 and 90 is a logic signal. Logic "0" means that the corresponding semiconductor switch is switched off and logic "1" means that the corresponding semiconductor switch is switched on. The output signal of the gate unit is an analog signal which is suitable to switch the corresponding semiconductor switches on and off by way of their control electrode. The conductive separation between the logic and power circuits and the conversion of the logic signal into the suitable analog signal takes place in the gate unit.

Figure 5:
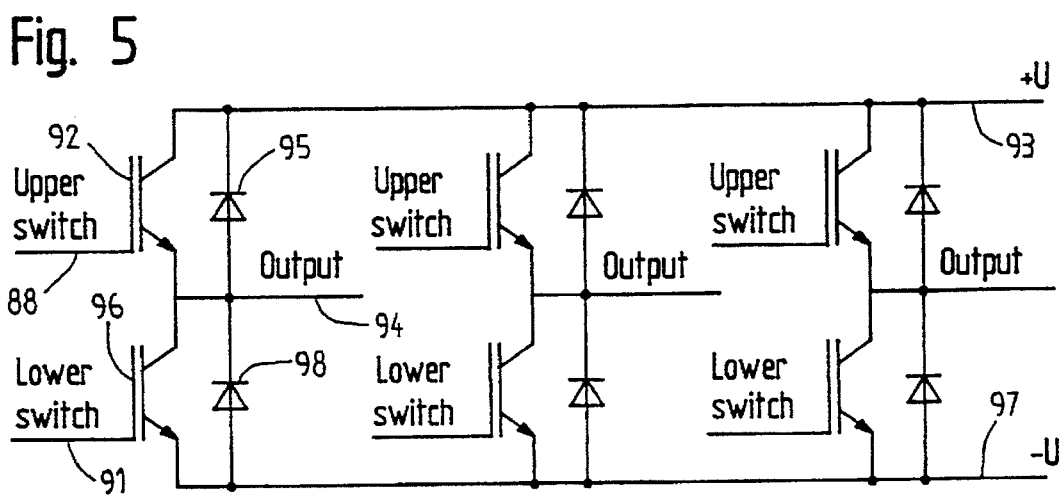
FIG. 5 is a schematic diagram of 6-pulse bridge of the static inverter system shown in the FIG. 2.

There is shown in the FIG. 5 the 6-pulse bridge 13 (also 23 and 33) in the static inverter 1 shown in the FIG. 2. The power portion consists of two switchable power semiconductors and two freewheel diodes for each phase. For example, an upper switch 92 has a base or gate connected to the line 88, a collector connected to a positive polarity voltage supply line 93, and an emitter connected to an output line 94. A first diode 95 has a cathode connected to the line 93 and an anode connected to the line 94. A lower switch 96 has a base or gate connected to the line 91, an emitter connected to a negative polarity voltage supply line 97, and a collector connected to the output line 94. A second diode 98 has a cathode connected to the line 94 and an anode connected to the line 97. By switching on the upper switch 92 or the lower switch 96, the bridge output line 94 is connected with the positive polarity voltage +U or the negative polarity voltage −U respectively of a direct current power supply (not shown).

There is shown in the FIG. 6 one phase of the three-phase total current regulator 63 (also 73) in the static inverter system shown in the FIG. 2. The total current regulator 63 has the actual current value signal input connected to the line 10g, the target current value signal input connected to the line 9e and the output connected to a modulator control signal line 101. The signal on the line 9e is the target current value, limited to the permissible value, of the total current into the Load A 61 and generated by the control FPM 7. The signal on the line 10g is the actual current value of the total current into the Load A generated by the current-measuring member 62. As an output signal, the regulator 63 generates the modulator control signal for the modulator 64. All of the signals are analog signals. The total current regulator 63 includes one regulator unit, as shown in the FIG. 9, for each phase. The task of the regulator 63 is to generate a control signal on the basis of the target value and the actual value in such a manner that the target value and the actual value agree as far as possible in the closed regulating loop.

There is shown in the FIG. 7 one phase of the three-phase equalizing regulator 65 (also 75) in the static inverter system shown in the FIG. 2. The regulator 65 includes an input interface circuit SME having a switching means for each inverter such as a switching means 102 for the inverter 1. The switching means 102 has an input connected to the actual current value signal line 10b for receiving the actual current value signal from the current measuring member 14. A switching input of the switching means 102 is connected to the signal line 10h for receiving a switch control signal from the control 7 when the inverter 1 is to be connected to one of the loads. The regulator 65 includes an output interface circuit SMA having a switching means for each inverter such as a switching means 103 for the inverter 1. The switching means 103 has an output connected to the inverter control signal line 9b for generating the inverter control signal as an analog signal to the signal delay circuit 11 of the static inverter 1. The regulator 65 also includes a summing circuit 104 having an input from each of the switching means in the circuit SME and an output at which is generated a signal corresponding to the total current into the selected load. The output of the summing circuit 104 is connected to an input of a multiplier circuit for each static inverter, such as a multiplier circuit 105 for the inverter 1. Another input to the multiplier circuit 105 is the current share signal representing the share of the total current for the inverter 1 generated on the line 10h from the control 7. The multiplier circuit 105 generates a target current value signal representing the value of the current to be supplied by the static inverter 1 at an output connected to a target input of a regulator unit 106. The regulator unit has an actual input connected to the output side of the switching means 102 and an output connected to an input side of the switching means 103. The task of the regulator unit 106 is to generate an inverter control signal on the line 9b on the basis of the target current value signal and the actual current value signal in such a manner that the target value and the actual value agree as far as possible in the closed regulating loop.

There is shown in the FIG. 8 one phase of the three-phase modulator 64 (also 74) in the static inverter shown in the FIG. 2. The modulator 64 has the modulator control signal line 101 with the modulator control signal from the total current regulator 63 connected to a non-inverting input of a comparator 107. An inverting input of the comparator 107 is connected to a carrier signal generator 108 to receive a carrier signal which is an analog signal. An output of the comparator 107 is connected to an inverter drive signal line 109 to generate the inverter drive signal for the static inverter at the input distributor 4. The inverter drive signal is a logic signal wherein logic "0" means that the lower semiconductor switch of the 6-pulse bridge 13 is switched on and a logic "1" means that the upper semiconductor switch of the bridge is switched on. The task of the modulator 64 is to produce, from the analog modulator control signal, the inverter drive signal in the form of a logic signal for the static inverters connected to the modulator.

There is shown in the FIG. 9 the regulator unit 63 which has the same construction as the regulator 106 shown in the FIG. 7. The regulator unit 63 has the target current value signal line 9e and the actual current value signal line 10g connected to inputs of a first summing circuit 110. An output of the summing circuit 110 is connected to an input of a PID regulator 111. The regulator 111 includes, for example, a proportional portion (K) 112, an integrating portion (∫) 113, a differentiating portion (d/dt) 114 and a second summing circuit (Σ) 115. The input of the PID regulator 111 is connected to an input of each of the portions 112, 113 and 114 and those portions each have an output connected to a corresponding input to the summing circuit 115. An output of the summing circuit 115 is connected to the modulator control signal line 101. The task of the regulator unit is to form a control signal on the basis of the target value and the actual value in such a manner that the target value and the actual value agree as far as possible in the closed regulating loop.

Figure 10:
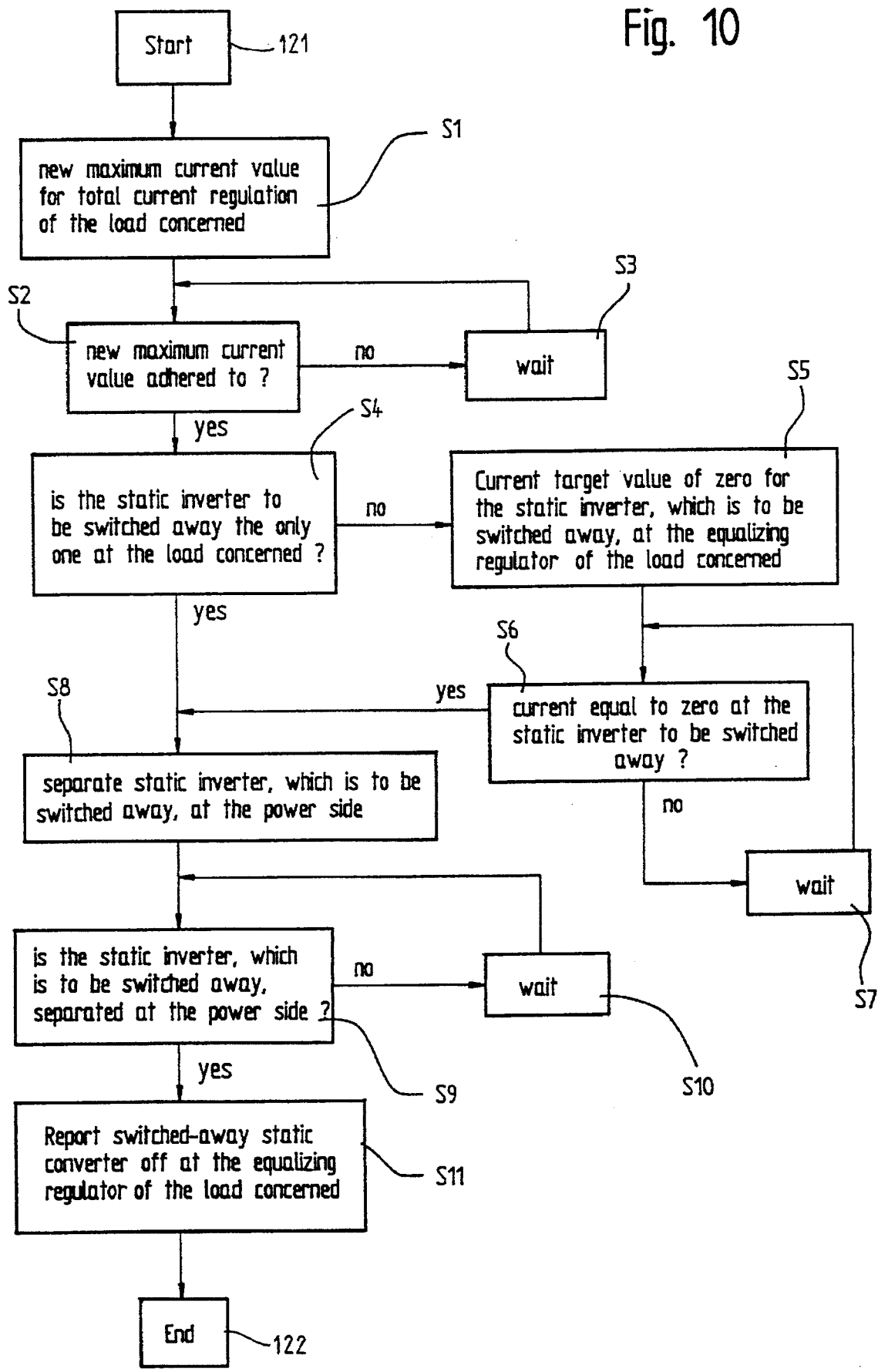
FIG. 10 is a flow diagram of the switching operation of the static inverter system according to the present invention when disconnecting a static inverter from a load.

There is shown in the FIG. 10 a flow diagram of the method of operation of the present invention for switching a static inverter away from a load. The diagram begins at a block 121 for the start of the operation, for which it is presupposed that the static inverter system is connected in a usual operating state and that the static inverter to be switched is also actually connected to a load. The settings of the switches at the input side (distributor 4) and the switches at the load side (distributor 5) must agree, i.e. each static inverter is connected with the modulator belonging to that load to which the static inverter is connected. In case a static inverter is not connected to any load, it does not matter whether and with which modulator that static inverter is connected. Parallel connected static inverters are regulated for equalization. The maximum current values of the total current regulator are so chosen that the static inverters are not overloaded for the connected number of static inverters. In case no static inverters are connected to the total current regulator, the total current regulator will have zero as the maximum current value.

The method enters a step S1 and the control FPM 7 determines the new maximum current value for the total current regulator of the load to which the static inverter to be switched away is connected. This new maximum current value must be equal to or less than the capacity of the inverter(s) remaining connected to the load. The method enters a step S2 in which it is checked whether the new maximum current value has been reached and maintained. If not, the method branches at "no" to a step S3 for a predetermined waiting period before returning to the step S2. The loop formed by the steps S2 and S3 is run through until a positive test result is present. Then, the method branches at "yes" to a step S4 in which it is determined whether the static inverter to be switched away is the only static inverter connected to the load. In the case of at least one other static inverter being connected to the load, the method branches at "no" to a step S5 in which the target current value of zero is preset in the equalizing regulator associated with the static inverter to be switched away. The method enters a step S6 in which it is determined if the current of the static inverter to be switched away is zero. If the current is not zero, the method branches at "no" to a step S7 for a predetermined waiting period before returning to the step S6. The loop formed by the steps S6 and S7 is run through until a positive test result is present. The method branches at "yes' from both of the steps S4 and S6 to a step S8 where the inverter is disconnected from the load at the power side (output distributor 5) of the control. The method enters a step S9 and the control FPM 7 checks whether the static inverter to be switched away has actually been disconnected. If not, the method branches at "no" to a step S10 for a predetermined waiting period before returning to the step S9. The loop formed by the steps S9 and S10 is run through until a positive test result is present. The method branches at "yes' from the step S9 to a step S11 wherein the switched static inverter is reported as disconnected to the equalizing regulator concerned and is disconnected from the modulator associated with the load. The method ends at a block 122.

Figure 11:
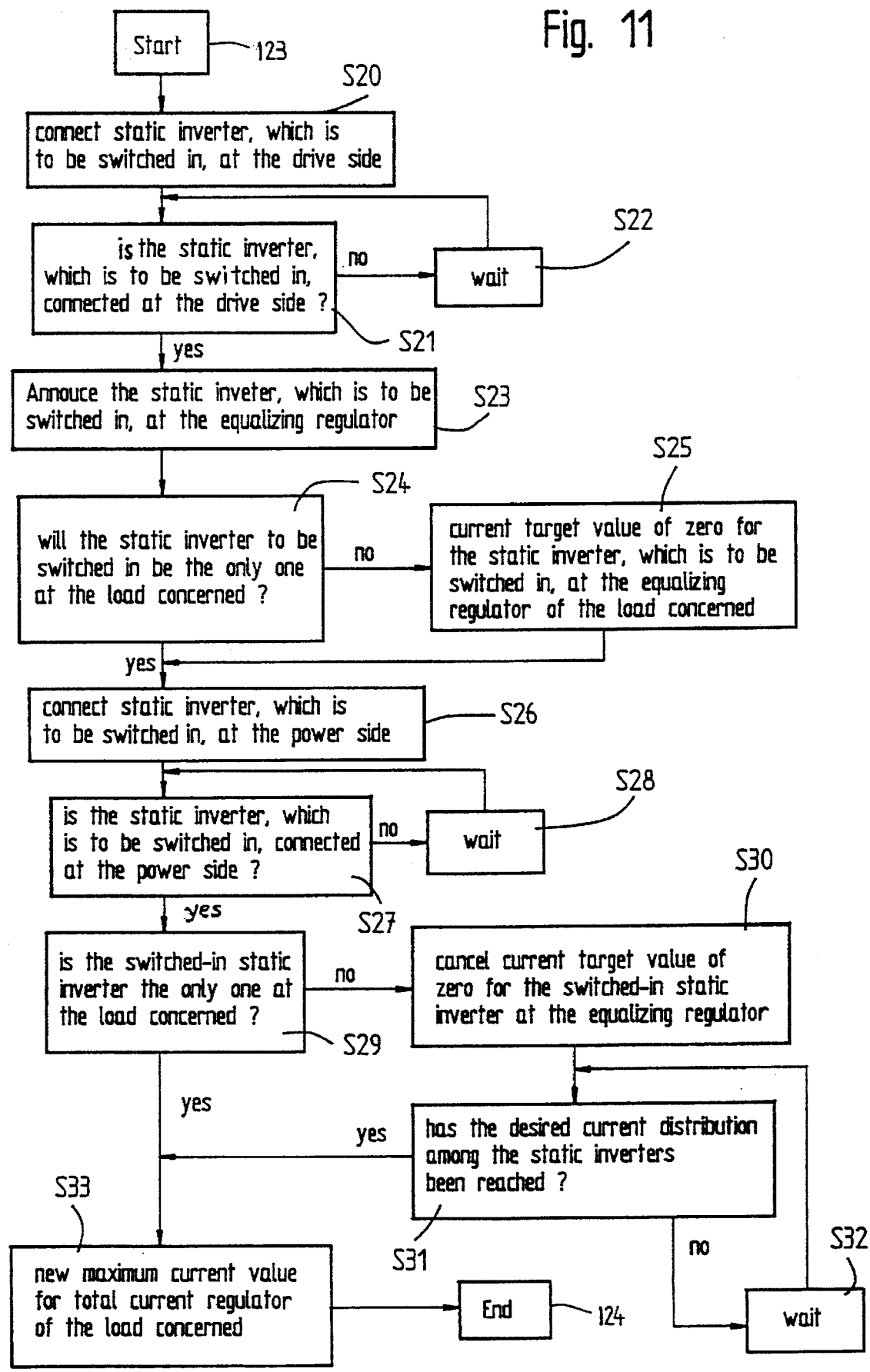
FIG. 11 is a flow diagram of the switching operation of the static inverter system according to the present invention when connecting a static inverter to a load.

There is shown in the FIG. 11 a flow diagram of the method of operation of the present invention for switching a static inverter to a load. The method begins at a block 123 for the start of the operation where it is presupposed that the static inverter system is connected in a usual operating state and that the static inverter to be switched is also actually not connected to any load. The settings of the switches at the input distributor 4 and at the output distributor 5 must agree, i.e. each static inverter is connected with the modulator belonging to that load to which it is connected. In case a static inverter is not connected to any load, it does not matter whether and with which modulator the static inverter is connected. Parallel connected static inverters are regulated for equalization. The maximum current values of the total current regulator are so chosen that the static inverters are not overloaded for the connected number of static inverters. In case no static inverters are connected to the total current regulator, the total current regulator will have zero as maximum current value.

The method enters a step S20 wherein the control FPM 7 connects the static inverter, which is to be switched in, to the drive side (input distributor 4) of the system. The method then enters a step S21 to check whether the static inverter to be switched in is actually connected at the drive side. If the inverter is not connected, the method branches at "no" to a step S22 for a predetermined waiting period before returning to the step S21. The loop formed by the steps S21 and S22 is run through until a positive test result is present and the method branches at "yes" to a step S23 in which the static inverter to be switched in is reported to the equalizing regulator. The method enters a step S24 in which it is checked whether any other static inverters are connected to the load. If at least one other inverter is connected, the method branches at "no" to a step S25 in which the target current value of zero for the static inverter to be switched in is preset for the equalizing regulator concerned. The method enters a step S26 from a "yes' branch of the step S24 and from the step S25. In the step S26, the static inverter to be switched in is connected at the power side (output distributor 5) of the system. The method enters a step S27 and checks whether the static inverter is connected to the power side of the system. If not, the method branches at "no" to a step S28 for a predetermined waiting period before returning to the step S27. The loop formed by the steps S27 and S28 is run through until a positive test result is present. If the inverter is connected, the method branches at "yes" to a step S29 where it is checked whether the inverter is the only one connected to the load. If at least one other inverter is connected, the method branches at "no' to a step S30 where the new target current value of zero is cancelled. The method enters a step S31 where a check is made whether the desired current distribution has been reached. If not, the method branches at "no" to a step S32 for a predetermined waiting period before returning to the step S31. The loop formed by the steps S31 and S32 is run through until a positive test result is present. The method branches at "yes" from both the step S29 and the step S31 to a step S33 where a new maximum value for the total current regulator of the load concerned is determined. The method ends at a block 124.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of allocating at least one static inverter to at least one load comprising the steps of:
   a. connecting a plurality of static inverters to a load to be supplied with electrical current by the static inverters, each of the static inverters having a maximum current capability, setting a maximum current value for the load limited by a total of the maximum current capabilities of all the static inverters connected to the load and setting a target current value for the load no greater than the maximum current value;
   b. setting a current share value for each of the static inverters connected to the load, each current share value limited by the maximum current capability of an associated one of the static inverters;
   c. comparing the target current value with an actual total current value for current supplied to the load by the static inverters connected to the load to obtain a total current difference;
   d. regulating a drive for the static inverters connected to the load to reduce the total current difference to zero;
   e. comparing the current share value for each static inverter connected to the load with an actual inverter current value for that static inverter to obtain an associated inverter current difference for each static inverter connected to the load; and
   f. regulating each of the static inverters connected to the load separately to reduce the associated inverter current difference to zero.

2. The method according to claim 1 including the steps of:
   g. determining that one of the static inverters is a switched away static inverter to be disconnected from the load;
   h. setting a new maximum current value for the load limited by a total of the maximum current capabilities of the static inverters that will remain connected to the load;
   i. setting the current share value of the switched away static inverter to zero;
   j. disconnecting the switched away static inverter from the load; and
   k. discontinuing the steps e. and f. for the switched away static inverter.

3. The method according to claim 1 including the steps of:
   g. determining that another static inverter is a switched in static inverter to be connected to the load;
   h. connecting the switched in static inverter to the drive for the static inverters connected to the load;
   i. setting the current share value of the switched in static inverter to zero;
   j. connecting the switched in static inverter to the load;
   k. setting a new current share value of the total current requirement for each static inverter connected to the load, including the switched in static inverter, each new current share value limited by a maximum current capability of an associated one of the static inverters connected to the load; and
   l. setting a new maximum current value for the load limited by a total of maximum current capabilities of all static inverters connected to the load and setting a target current value for the load no greater than the new maximum current value.

4. An apparatus for allocating at least one static inverter to at least one load comprising:
   an allocated static inverter adapted to be connected to a source of direct current power for generating alternating current power in response to an inverter drive signal;
   a control unit for allocating said allocated static inverter to a load, for generating a target current value signal representing a total current to be supplied to the load and for generating a current share signal for each static inverter connected to the load, each said current share signal representing a share of said total current to be supplied by an associated static inverter connected to the load;
   an output distributor connected to said control unit and to said allocated static inverter and being responsive to a first control signal generated by said control unit for applying alternating current power from said allocated static inverter to the load;
   an equalizing regulator means connected to said control unit and to said allocated static inverter and being responsive to a second control signal and to said current share signal generated by said control unit and to an actual inverter current value signal representing actual current flowing from said allocated static inverter to the load for regulating said actual current to said share for said allocated static inverter;

a current measuring member connected in series with said output distributor and the load and responsive to current flowing to the load for generating an actual total current value signal;

a total current regulator means connected to said control unit and to said current measuring member and being responsive to said target current value signal and said actual total current value signal for controlling a modulator means;

a modulator means connected to said total current regulator and to said input distributor and being responsive to control by said total current regulator for driving said allocated static inverter to generate alternating current power; and an input distributor connected to said control unit, said modulator means and said allocated static inverter and being responsive to a third control signal generated by said control unit for connecting said modulator means to said allocated static inverter.

5. The apparatus according to claim 4 wherein said allocated static inverter includes a signal delay circuit for delaying generation of said alternating current power for a predetermined time relative to being connected to said modulator means.

6. The apparatus according to claim 5 wherein said signal delay unit includes a unipolar/bipolar converter having an input for receiving said inverter drive signal and an output, an integrator with limiter having an input connected to said output of said unipolar/bipolar converter and an output, an inverter with limiter having an input for receiving said inverter control signal and an output, and a comparator having a noninverting input connected to said output of said integrator with limiter, an inverting input connected to said output of said inverter with limiter and an output for generating a drive signal having leading and trailing edges shifted from leading and trailing edges respectively of said inverter drive signal.

7. The apparatus according to claim 6 wherein said allocated static inverter includes a drive circuit having an input and a pair of outputs and a 6-pulse bridge having a pair of inputs, each of said inputs being connected to one of said drive circuit outputs, and a power output for each of said static inverters, said drive circuit including a first dead-time member and a first gate unit responsive to said drive signal from said signal delay unit for generating an upper switch signal on one of said outputs of said drive circuit and an inverter, a second dead time member and a second gate unit responsive to said drive signal from said signal delay unit for generating a lower switch signal on another one of said outputs of said drive unit, said 6-pulse bridge having a semiconductor switch connected between a source of direct current power and one of said power outputs and being responsive to one of said upper and lower switch signals for generating said alternating current power.

8. The apparatus according to claim 4 wherein said equalizing regulator means includes an input interface circuit, a summing circuit, a plurality of multiplier circuits, a plurality of regulator units and an output interface circuit, said input interface circuit being responsive to said second control signal for applying said actual inverter current value signals to said summing circuit to obtain a current sum, each of said multiplier circuits being responsive to said current sum and one of said current share signals for generating a target signal, each of said regulator units being responsive to one of said target signals and a corresponding one of said actual inverter current value signals for generating said inverter control signal and said output interface circuit being responsive to said second control signal for applying said inverter control signals to said corresponding static inverters.

9. The apparatus according to claim 4 wherein said total current regulator means includes a first summing circuit responsive to said target current signal and said actual total current for generating a difference output, a proportional portion, an integrating portion, a differentiating portion, said portions each receiving said difference output and generating a portion output, and a second summing circuit responsive to said portion outputs for generating a control signal to said modulator means.

10. An apparatus for allocating at least one static inverter to at least one load comprising:

an allocated static inverter having an inverter drive signal input, an inverter control signal input, a power output and an actual inverter current value output, said allocated static inverter adapted to be connected to a source of direct current power for generating alternating current power at said power output in response to an inverter drive signal at said inverter drive signal input and an inverter control signal at said inverter control signal input;

an input distributor having an inverter drive signal input for each load to which said allocated static inverter is to be connected, an input distributor switch control signal input for each load to which said allocated static inverter is to be connected and an inverter drive signal output, said inverter drive signal output being connected to said inverter drive signal input of said allocated static inverter, said input distributor being responsive to an input distributor switch control signal at said input distributor switch control signal inputs for connecting a selected one of said inverter drive signal inputs of said input distributor to said inverter drive signal output;

an output distributor having a power input, an output distributor switch control signal input for each load to which said allocated static inverter is to be connected and a power line output for each load to which said allocated static inverter is to be connected, said power input being connected to said power output of said allocated static inverter and each said power line output adapted to be connected to an associated load, said output distributor being responsive to an output distributor switch control signal at said output distributor switch control signal inputs for connecting said power input to a selected one of said power line outputs;

a separate current measuring member connected to each said power line output of said output distributor, each said current measuring device generating an actual total current value signal representing a total current flowing from said connected power line output of said output distributor to a connected load;

a modulator for each load to which said allocated static inverter is to be connected, each said modulator having a modulator control signal input and an inverter drive signal output, said inverter drive signal output being connected to said inverter drive signal input of said input distributor, said modulator being responsive to a modulator control signal at said modulator control signal input for generating said inverter drive signal at said inverter drive signal output of said modulator;

a total current regulator having a target current value signal input, an actual total current value signal input and a modulator control signal output, said actual total current value signal input being connected to said current measuring member for receiving said actual total current value signal and said modulator control signal output being connected to said modulator control signal input of said modulator, said total current regulator being responsive to a target current value signal at said target current value signal input and said actual total current value signal at said actual total current value signal input for generating said modulator control signal at said modulator control signal output;

an equalizing regulator having a switch control signal input, a current share signal input, an actual inverter current value signal input and an inverter control signal output, said actual inverter current value signal input being connected to said actual inverter current signal output of said allocated static inverter and said inverter control signal output being connected to said inverter control signal input of said allocated static inverter, said equalizing regulator being responsive to switch control signals at said switch control signal input, to current share signals at said current share signal input and said actual inverter current value signal at said actual inverter current value input for generating said inverter control signal at said inverter control signal output; and a control unit having a target current value signal output connected to said target current value signal input of said total current regulator, an input distributor switch control signal output connected to said input distributor switch control input of said input distributor, a switch control signal output connected to said switch control signal input of said equalizing regulator, a current share signal output connected to said current share signal input of said equalizing regulator and an output distributor switch control signal output connected to said output distributor switch control input of said output distributor whereby when a load is connected to the power line output and said allocated static inverter is to be connected to the load, said control unit generates said target current value signal with a value representing a total current to be supplied to the load, generates said input distributor switch control signal to apply said inverter drive signal to said inverter drive signal input of said allocated static inverter, generates said switch control signal and said current share signal to generate alternating current power at said power output of said allocated static inverter and generates said output distributor switch control signal to apply said alternating current power to the load, and said equalizing regulator generates said inverter control signal to control said allocated static inverter for generating said alternating current power with a current flow to the load in an amount equal to a predetermined share of said target current value, said predetermined share being based upon a number of other static inverters supplying alternating current power to the load in parallel with said allocated static inverter.

11. The apparatus according to claim 10 wherein said allocated static inverter includes a signal delay circuit for delaying generation of said alternating current power for a predetermined time relative to receiving said inverter drive signal at said inverter drive signal input of said allocated static inverter.

12. The apparatus according to claim 11 wherein said signal delay unit includes a unipolar/bipolar converter having an input connected to said inverter drive signal input and an output, an integrator with limiter having an input connected to said output of said unipolar/bipolar converter and an output, an inverter with limiter having an input connected to said inverter control signal input and an output, and a comparator having a noninverting input connected to said output of said integrator with limiter, an inverting input connected to said output of said inverter with limiter and an output for generating a drive signal having leading and trailing edges shifted from leading and trailing edges respectively of said inverter drive signal.

13. The apparatus according to claim 12 wherein said allocated static inverter includes a drive circuit having an input connected to said comparator output and a pair of outputs and a 6-pulse bridge having a pair of inputs, each of said inputs being connected to one of said drive circuit outputs, and a power output connected to said power output of said allocated static inverter, said drive circuit including a first dead-time member and a first gate unit responsive to said drive signal from said signal delay unit for generating an upper switch signal on one of said outputs of said drive circuit and an inverter, a second dead time member and a second gate unit responsive to said drive signal from said signal delay unit for generating a lower switch signal on another one of said outputs of said drive unit, said 6-pulse bridge having a semiconductor switch connected between a source of direct current power and one of said power outputs and being responsive to one of said upper and lower switch signals for generating said alternating current power.

14. The apparatus according to claim 11 wherein said equalizing regulator means includes an input interface circuit connected to said switch control signal input and to said actual inverter current value signal input, a summing circuit connected to said input interface circuit, a multiplier circuit connected to said summing circuit and to said current share signal input for generating a target signal, a regulator unit connected to said multiplier circuit and to said input interface circuit for generating said inverter control signal and an output interface circuit connected to said switch control signal input and to said regulator unit for generating said inverter control signal at said inverter control signal output.

15. The apparatus according to claim 11 wherein said total current regulator means includes a first summing circuit connected to said target current value signal input and to said actual total current value input for generating a difference output, a proportional portion, an integrating portion, a differentiating portion, said portions each receiving said difference output and generating a portion output, and a second summing circuit responsive to said portion outputs for generating said modulator control signal to said modulator means.

\* \* \* \* \*